United States Patent
Geyer

(10) Patent No.: US 9,442,619 B2
(45) Date of Patent: Sep. 13, 2016

(54) METHOD AND DEVICE FOR PROVIDING A USER INTERFACE, IN PARTICULAR IN A VEHICLE

(75) Inventor: Christoph Geyer, Wettmershagen (DE)

(73) Assignee: VOLKSWAGEN AG, Wolfsburg (DE)

( * ) Notice: Subject to any disclaimer, the term of this patent is extended or adjusted under 35 U.S.C. 154(b) by 83 days.

(21) Appl. No.: 14/000,278

(22) PCT Filed: Feb. 6, 2012

(86) PCT No.: PCT/EP2012/000526
§ 371 (c)(1),
(2), (4) Date: Oct. 1, 2013

(87) PCT Pub. No.: WO2012/110207
PCT Pub. Date: Aug. 23, 2012

(65) Prior Publication Data
US 2014/0025263 A1    Jan. 23, 2014

(30) Foreign Application Priority Data
Feb. 19, 2011    (DE) .................... 10 2011 011 802

(51) Int. Cl.
*G06F 3/048*    (2013.01)
*B60K 35/00*    (2006.01)
(Continued)

(52) U.S. Cl.
CPC ............... *G06F 3/048* (2013.01); *B60K 35/00* (2013.01); *B60K 37/06* (2013.01); *B60W 50/10* (2013.01); *G06F 3/0418* (2013.01);
(Continued)

(58) Field of Classification Search
CPC .. B60W 50/06; B60W 50/08; B60W 50/087; B60W 50/10

USPC ..................................... 345/156–184; 701/49
See application file for complete search history.

(56) References Cited

U.S. PATENT DOCUMENTS 6,104,969 A * 8/2000 Beeks .................... G01C 23/00
345/157
6,501,515 B1   12/2002 Iwamura
(Continued)

FOREIGN PATENT DOCUMENTS

DE         195 29 571    2/1997
DE    10 2006 037 156    9/2007
(Continued)

OTHER PUBLICATIONS

International Preliminary Report on Patentability and Written Opinion, dated Aug. 29, 2013, issued in corresponding International Application No. PCT/EP2012/000526.
(Continued)

*Primary Examiner* — Aaron L Troost
(74) *Attorney, Agent, or Firm* — Kenyon & Kenyon LLP

(57) ABSTRACT

A method and device for providing a user interface includes an operator unit having multiple operator positions, in particular in a vehicle. In the method, a manual operator action for the operator unit, executed by a control element, is detected, and during the manual operator action an acceleration of at least one reference system associated with the control element or the operator unit is detected. Through the manual operator action, an input for a certain operating position is detected, the detected acceleration is used to calculate a correction for the detected operator position, and a control signal associated with the corrected operator position is generated.

17 Claims, 3 Drawing Sheets

(51) Int. Cl.
*G06F 3/041* (2006.01)
*B60W 50/10* (2012.01)
*B60K 37/06* (2006.01)
*G06F 3/0488* (2013.01)

(52) U.S. Cl.
CPC .. *G06F 3/04883* (2013.01); *B60K 2350/1004* (2013.01); *B60K 2350/1012* (2013.01); *B60K 2350/1028* (2013.01); *B60K 2350/1032* (2013.01); *B60K 2350/1052* (2013.01); *B60W 2520/105* (2013.01); *G06F 2203/04108* (2013.01)

(56) References Cited

U.S. PATENT DOCUMENTS

| | | | |
|---|---|---|---|
| 2009/0201246 A1* | 8/2009 | Lee | G06F 1/1626 345/156 |
| 2009/0327977 A1* | 12/2009 | Bachfischer | B60K 35/00 715/863 |
| 2010/0130259 A1 | 5/2010 | Lee | |
| 2011/0012869 A1* | 1/2011 | Klinghult | 345/178 |
| 2011/0050563 A1* | 3/2011 | Skutt | 345/156 |
| 2011/0175843 A1 | 7/2011 | Bachfischer et al. | |
| 2011/0265036 A1 | 10/2011 | Hoehne | |
| 2012/0154294 A1* | 6/2012 | Hinckley | G06F 1/1649 345/173 |

FOREIGN PATENT DOCUMENTS

| | | |
|---|---|---|
| DE | 10 2007 034 273 | 1/2009 |
| DE | 10 2008 005 106 | 7/2009 |
| DE | 10 2008 052 485 | 4/2010 |
| DE | 10 2009 037 104 | 2/2011 |
| EP | 1 335 318 | 8/2003 |
| EP | 1 935 704 | 6/2008 |
| FR | 2 939 531 | 6/2010 |

OTHER PUBLICATIONS

International Search Report, dated Jun. 29, 2012, issued in corresponding International Application No. PCT/EP2012/000526.
German Search Report, dated Jul. 5, 2011, issued in corresponding German Patent Application No. 10 2011 011 802.0.

* cited by examiner

METHOD AND DEVICE FOR PROVIDING A USER INTERFACE, IN PARTICULAR IN A VEHICLE

FIELD OF INVENTION

The present invention relates to a method and a device for providing a user interface having an operator unit which includes a plurality of operator positions, especially in a vehicle.

BACKGROUND INFORMATION

User interfaces are known in particular from computers and control systems of electronic devices, where they allow an interaction between the user and the machine. The interaction can be realized via defined operator positions, e.g., by mechanical keys, which are selectable by a user via manual operator actions. Known in particular are control systems having graphical user interfaces, which allow a user to control graphic display content, also referred to as objects. For example, the objects may be selected or shifted via a touch-sensitive display panel, or by gestures that are detected in front of or on the display panel.

Various methods for displaying display content have been developed in an effort to make it easier and faster for the user to comprehend display content. U.S. Patent Application Publication No. 2010/0130259, for example, describes a mobile terminal, with whose aid images are projectable. Trembling of the hand holding the terminal can be detected by a sensor and the projected image corrected accordingly.

Furthermore, methods are known that allow a user to control display content. German Application No. DE 10 2008 052 485 describes scribes a method for displaying information, sorted in the form of lists, with the aid of different operator actions. One special operator action consists of the user moving the display panel, and the direction of movement of the display panel can be used to infer the direction in which a displayed list is to be scrolled through.

European Patent No. EP 1 335 318 describes a touch screen, which provides capacitive approach sensing, for example. A point of a subsequent display segment is determined by the sequential detection of the approach of an object in the direction of the touch screen.

In a vehicle, especially a motor vehicle, various electronic devices are provided which the driver or another vehicle passenger must be able to operate. Among these devices are, for example, a navigation system, a driver assistance system, control systems for comfort devices such as the air-conditioning system, and communications and multimedia applications including a telephone system, a radio or a CD player, for example.

The operation of the many types of devices in a vehicle imposes very specialized demands, inasmuch as it may be carried out by the driver, among other people. Therefore, it is very important that the operator action and the comprehension of the related information does not distract the driver while engaged in driving. The operator action should therefore require as little attention as possible on the part of the driver and furthermore be able to be carried out rapidly.

SUMMARY

It is an object of the present invention to provide a method and a device for providing a user interface, for which improved manual interaction between the user and control system is possible. The user's attention required for operating the user interface should be as minimal as possible, while operator errors should be avoided in addition.

In the method for providing a user interface according to the present invention, a manual operator action for the operator unit, executed by a control element, is detected, and during the manual operator action an acceleration of at least one reference system associated with the control element or the operator unit is detected. An input for a certain operator position is detected by way of the manual operator action, the detected acceleration is used to calculate a correction for the determined operator position, and a control signal associated with the corrected operator position is generated. This has an advantage of reducing the risk of an erroneous input due to external interference of at least one of the reference systems in which the operator unit or the control element is situated. The intended input of the user is able to be determined by detecting the operator action. When the control signal is generated, it is possible to take the external interference, which was detected as acceleration, into account accordingly.

A reference system is defined as a coordinate system which is moved along with a body. In the method of the present invention, this may be any type of constellation in which the reference system of the operator unit, the control element or of both devices undergoes accelerations, e.g., in moving vehicles, on work platforms, floating pontoons, or generally, in an environment in which vibrations arise. Such an acceleration in particular may also be relevant if, for example, the operator unit is gimbal-mounted, or if the user is positioned on a seat featuring vibration damping. These accelerations may lead to unintentional relative movements between the operator unit and the control element, which could result in faulty operations.

In an operator action of a user in a vehicle, the user, the control element, e.g., his finger, and an operator unit mounted in the vehicle may be located in reference systems that are moved relative to each other. In such a context, accelerations of the reference system of the vehicle may occur especially in the course of driving. For example, they may happen when driving over uneven surfaces. If the hand or the arm of the user is not supported under those circumstances, an unintentional relative movement may occur between the operator unit and the control element, which is taken into account in the correction of the detected operator position in the method according to the present invention. The relative movement between user and control element may be separately detectable as operator action and may be calculated and isolated for further analysis. In so doing, it may be assumed, for one, that an acceleration of the vehicle in the vertical direction is not transmitted to the control element. On the other hand, it is also possible to consider that accelerations acting on the user from the outside, via the vehicle, are transferred to the control element, so that an acceleration that is acting on the reference system of the vehicle is also acting on the reference system of the control element, but generates a relative movement nevertheless.

The acceleration, for instance, may be recorded in three linearly independent directions, so that all accelerations in three-dimensional space are detected. Depending on the application, accelerations in individual directions may be of greater importance than in other directions. In the case of motor vehicles it is especially accelerations in the vertical direction, as produced when driving over potholes or wavy road surfaces, for example, that may be relevant. Longitudinal and lateral accelerations, as they occur in acceleration or deceleration processes of the vehicle or during cornering, may of course be considered as well.

To detect the intended input of the user, it is possible to detect in the operator action at least two points of an approach trajectory of the control element in the direction of the operator unit, which are taken into account when correcting the operator position. In an advantageous manner, they include at least two points prior to the detected acceleration, so that the original control intention of the user may be derived therefrom even more easily. Using a multitude of approach points, in particular, it is advantageously possible to conduct a geometrical analysis of the approach of the control element in the direction of the operator unit during the operator action.

The time interval and the distance between at least two points of the approach trajectory and/or the average approach speed of the control element may be detected and considered when correcting the operator position. The average approach speed of the control element toward the operator unit is able to be determined with the aid of the time-resolved approach trajectory, for example, so that it may be utilized to determine the operating instant therefrom and to temporally link it to one or more detected acceleration events. If a multitude of time-resolved points of the approach trajectory are detected, then the input for the particular operator position that the user intended to operate may be determined from the points of the approach trajectory by linear extrapolation or regression. This makes it possible to prevent faulty operations even more effectively.

The corrected operator position, for example, may correspond to the calculated intersection of the approach trajectory and the operator unit without the detected acceleration of the reference system. This correction is relatively simple and able to be carried out rapidly. As an alternative, however, the corrected operator position may also be based on more complex computational algorithms, which, for example, consider the oscillation and damping behavior of the reference systems excited by the detected acceleration. Results of already concluded operator actions in which an acceleration event was detected may also be included in the calculation of a corrected operating position.

The input for a particular operating position may take different forms. The specific forms of input are first of all independent of the previously described correction methods. However, certain combinations may be especially meaningful for a particular application.

The input for a particular operator position may be implemented by touching the operator unit. As a result, the method according to the present invention may be used for common mechanical push-button switches or keyboards.

The input for a particular operator position may be realized in contact-free manner. For example, using suitable gesture recognition in a detection range in front of the display panel, a gesture may be detected in contactless manner and assigned to a particular control signal. This makes it possible to operate display contents in a variety of ways or to manipulate it, as described in German Application No. DE 10 2006 037 156, for example.

The operator positions may be displayed on a display panel in context-specific manner. This may be useful especially for operator units equipped with a touch-sensitive operating area, e.g., for operating touch screens with operator positions directly at the position of the displayed information on the display panel, or for operating touch pads in which the display panel and touch-sensitive operator unit are physically separate. It may be that discrete command buttons predefine discrete operator positions on the display panel, as this is also the case in conventional mechanical keyboards. As an alternative or in addition, it is possible to display graphics display contents on a freely programmable display panel, in which the operator positions may appear virtually continuously, that is to say, restricted solely by the pixel resolution of the display panel.

A command button within the meaning of the present invention may be a control element of a graphical user interface. A command button differs from elements and surfaces for the pure information display, so-called display elements or display areas, in that it is selectable. When a command button is selected, an assigned control command may be executed. The control command may also lead to a change in the information display. In addition, it is also possible to use the command buttons to control devices whose operation is supported by the information display.

Finally, when correcting the operator position, it is possible to consider the position of the keyboard or the position of the command buttons displayed on the display area, by which an operating raster is predefined. Given knowledge of the operating raster, i.e., the position of individually defined operator positions with respect to each other, the correction is able to be carried out even more effectively. This may be useful, for instance, when two adjacent keys or command buttons were operated simultaneously in an operator action having a relatively small acceleration. In such a case, the determination of the corrected operator position may alternatively provide only a choice between one of the simultaneously operated keys or command buttons.

The operator positions of the operator unit may be displayed corrected according to the detected acceleration. This may provide the user with immediate visual feedback as to which correction the system has made following the detected acceleration event. Through such a correction of the operator positions and also other display content, depending on the type of interference that has caused the accelerations, the user is able to comprehend it especially easily in visual manner. Such a correction may be advantageous in the case of vibrations or rocking motions from the outside.

The device according to the present invention for providing a user interface having an operator unit for detecting inputs, the operator unit including multiple operator positions, includes an approach-detection device to detect an operator action for the operator unit that was implemented manually with the aid of a control element. It may be characterized in that the device additionally includes at least one acceleration sensor for detecting an acceleration of at least one reference system associated with the control element or the operator unit during the manual operator action, and in that the device furthermore includes a control unit which is linked to the operator unit, to the approach-detection device and to the at least one acceleration sensor. In the input of a particular operator position, this control unit may be used to calculate a correction for the particular operator position on the basis of a recorded acceleration, and to generate a control signal associated with the corrected operator position. The device according to the present invention may be especially suitable for implementing the method according to the present invention. As a result, it likewise may offer the advantages of the method of the present invention.

The approach-detection device may be developed as a camera system, for example. It may furthermore include a reflection-light barrier, which includes at least one illumination device for emitting electromagnetic detection radiation into a detection region, and a receiving element for detecting a component of the detection radiation dispersed and/or reflected at the control element. It may in particular be designed to detect the control element in the detection region on the basis of the intensity of the received detection radiation. The approach-detection device may furthermore encompass various illumination devices for individual zones in the detection region, each illumination device emitting electromagnetic detection radiation into the particular zone. In addition, a modulation device may be provided to modulate the emitted detection radiation, so that the detection radiation emitted into the individual zones differs with regard to its modulation in each case. In this case the approach-detection device may also include an analysis unit, which is developed such that the received reflected and/or dispersed detection radiation is able to be analyzed with regard to its modulation, so that it may be ascertained in which zone the detection radiation was dispersed or reflected at a control element. The approach-detection device furthermore is able to support the detection of gestures, and thus also makes it possible to detect operator actions that are concluded with contactless inputs.

A vehicle may be equipped with such a device for providing a user interface.

Further features and aspects of example embodiments of the present invention are explained in greater detail below with reference to the appended Figures.

DETAILED DESCRIPTION

Figure 1:
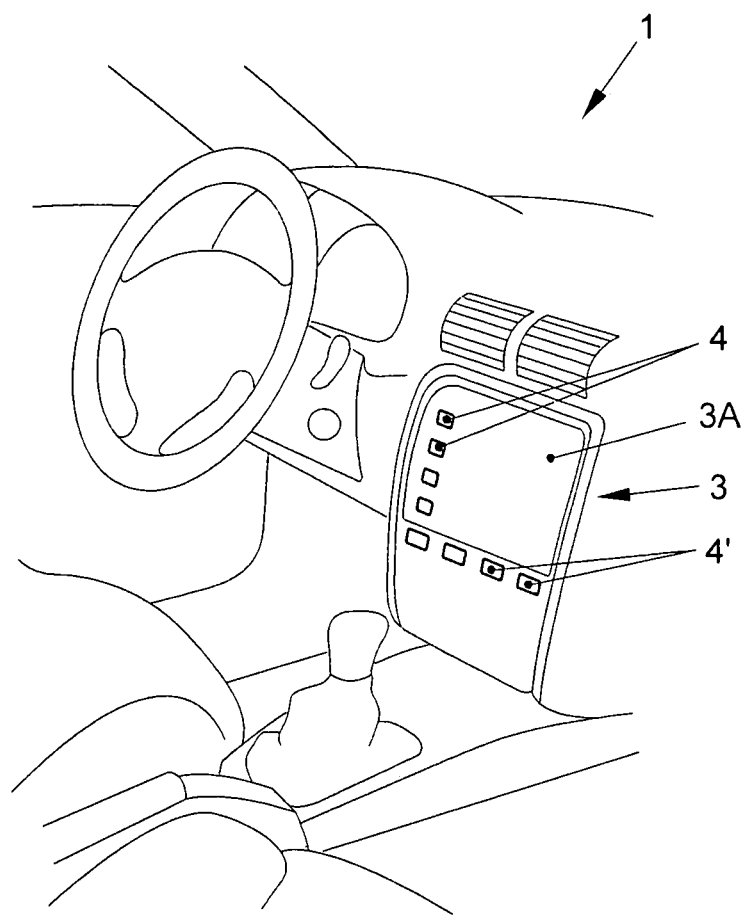
FIG. 1 shows a cockpit of a vehicle equipped with a device for providing a user interface according to one example embodiment of the present invention.

FIG. 1 shows a cockpit of a vehicle 1, which is equipped with a device 2 (see FIG. 2) for providing a user interface according to one example embodiment of the present invention. Operator unit 3 is situated in the upper region of the center console, so that the driver and passenger can operate it easily. Operator unit 3 encompasses a large display panel 3A and, at the lower edge thereof, multiple mechanical control keys 4', which represent discrete operator positions of operator unit 3. Further operator positions 4 may be predefined and displayed on display panel 3A. A few of the operator positions 4 may be display content that displays context-specific functions for adjacently located control keys 4'. Such control keys 4' are also called soft keys.

Display panel 3A in the example embodiment shown is freely programmable and may advantageously include a touch-sensitive surface. Thus, it may be operated as a so-called touch screen, for which a user, by touching appropriate operator positions 4, is able to directly trigger associated control commands. In the freely programmable display panel 3A, display content generated by programs is able to be displayed at any position on display panel 3A. For example, display panel 3A is an electrically controllable matrix display, especially a liquid crystal or plasma display. A discrete command button, for instance, or quasi-continuous display content such as a section of a navigation map is able to be displayed at a defined operator position 4.

Figure 2:
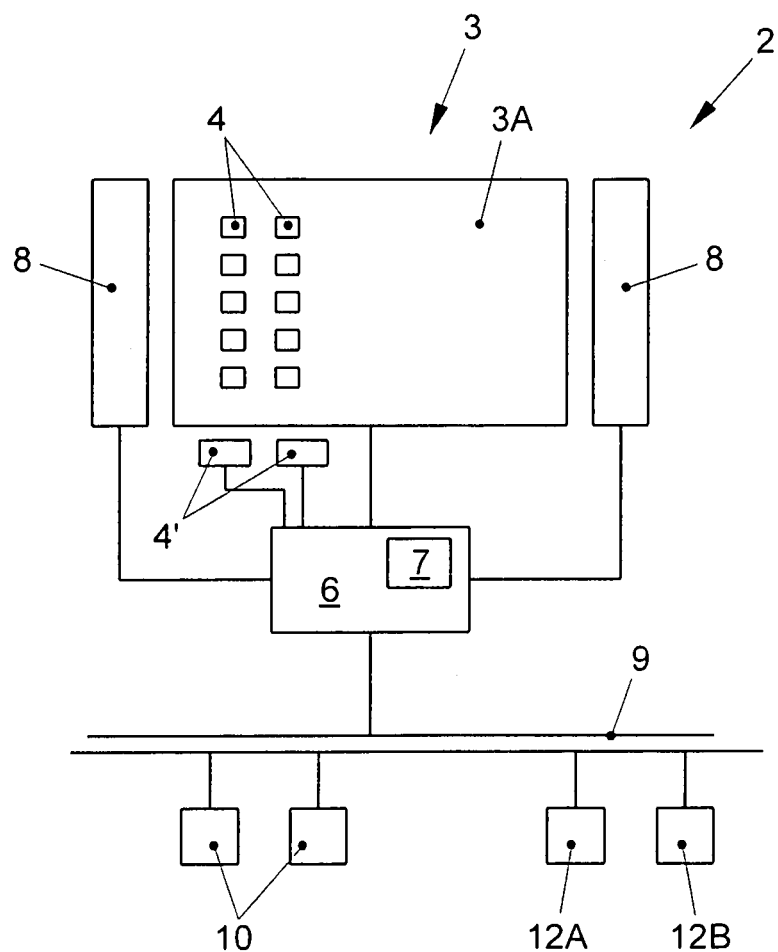
FIG. 2 schematically shows the design of an example embodiment of the device for providing a user interface according to the present invention.

FIG. 2 schematically shows the structure of an example embodiment of device 2 for providing a user interface according to the present invention. An operator unit 3 includes a display panel 3A provided with a touch-sensitive surface, on which different operator positions 4 are shown. It furthermore includes a plurality of control keys 4'. Display panel 3A and control keys 4' are connected to a control unit 6, so that a manual input of a user via an operator position 4 on display panel 3A and/or via a control key 4' is able to be received and analyzed by control unit 6.

Control unit 6 is furthermore connected to an approach-detection device 8 which monitors a region around operator unit 3. Approach-detection device 8, for example, includes a camera system or a zonally resolvable infrared light barrier, which may be situated next to operator unit 3 or at a suitable location in the cockpit or at the roof of the passenger compartment.

Via a data bus 9 in vehicle 1, control unit 6 is furthermore able to receive data from one or more acceleration sensor(s) 10. Acceleration sensors 10, for example, are installed in the radiator of vehicle 1 and are able to detect accelerations of vehicle 1 in the x-, y- and z-directions. The x-direction corresponds to the driving direction, the y-direction extends horizontally transversely to the driving direction, and the z-direction is aligned vertically. Furthermore, additional acceleration sensors, especially in the z-direction, may be situated in the front seats of the vehicle in order to detect vertical accelerations of the reference system of the seat surface, and thus of the driver or passenger.

For example, using device 2 for providing a user interface according to the present invention, function devices 12A, 12B are able to be operated, which are connected to control device 6 via data bus 9. These are, for instance, a driver assistance system 12A or an infotainment device 12B, without restricting the functions that are operable via operator unit 3 to these particular ones.

A processing unit 7 is integrated in control unit 6, which uses input via a particular operator position 5A as well as data from approach-detection device 8 and acceleration sensors 10 according to the method of the present invention, to be addressed in greater detail in the following text, to calculate a corrected operator position 5B.

Figure 3:
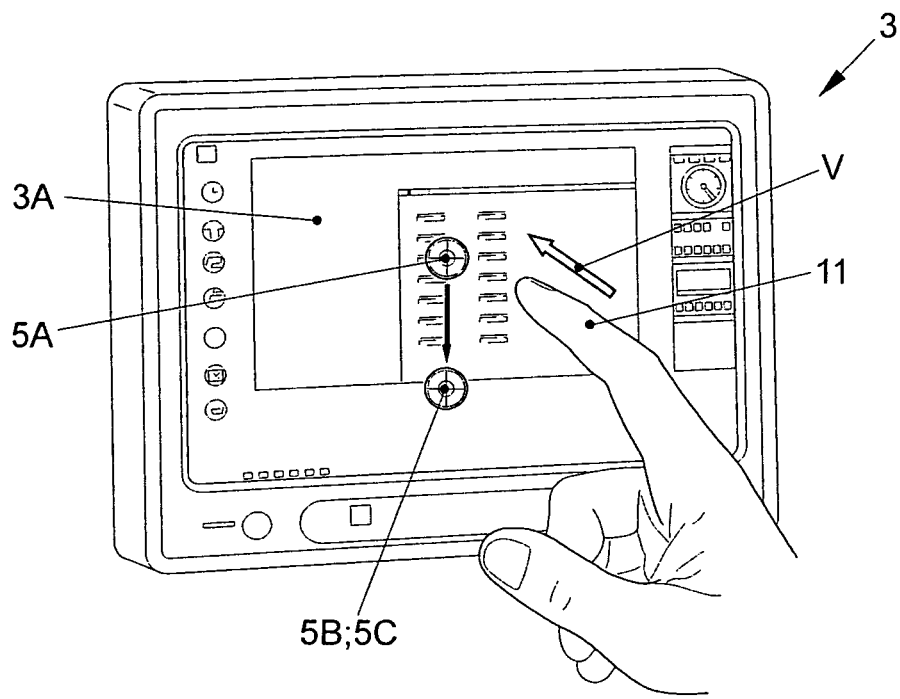
FIG. 3 shows a manual operator action for an operator unit including multiple operator positions according to one example embodiment of the method of the present invention.
Figure 4:
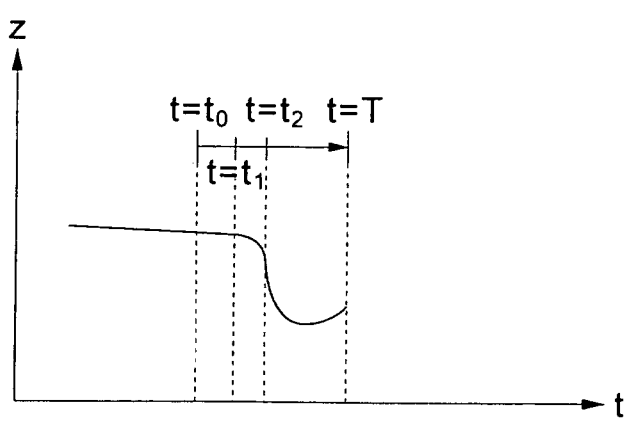
FIG. 4 schematically shows the time characteristic of the approach trajectory of the control element in relation to the operator unit during the operator action illustrated in FIG. 3.

The present invention will now be explained in greater detail on the basis of an example embodiment with reference to FIGS. 3 and 4. The execution of a manual operator action for a desired operator position 5C is shown in FIG. 3. An acceleration is meant to act on the reference system of operator unit 3 installed in vehicle 1 during the operator action. For example, vehicle 1 could be driving over a bump. In this context FIG. 4 schematically illustrates the temporal characteristic of the approach trajectory of control element 11 toward operator unit 3 during the operator action. The relative vertical shift of operator unit 3 caused by the acceleration in relation to a reference system that is fixed with respect to control element 11, is plotted vertically (z-axis), whereas the temporal development is plotted toward the right (t-axis).

In the simplest case it is assumed that control element 11 is not accelerated. However, it could also be taken into account that the approach trajectory of control element 11 in the direction of operator unit 3 also depends on their linkage to each other and on the oscillating behavior. For the application inside the vehicle, for instance, the user is linked to the vehicle via the seat, and the accelerations acting on the reference system of the vehicle propagate to the user to various degrees, depending on the suspension of the seat and the coupling of the user to the seat. It is of course also possible that multiple accelerations superpose or are detected one after the other during an operator action. For the sake of simplicity, only a single acceleration event is assumed in the example embodiment, which is not transmitted to control element 11.

Notwithstanding the fact that the method hereinafter will be described for use in a moving vehicle, it may also be used in other situations, e.g., when devices are operated in an environment with strong vibrations, or without fixed floor, e.g., when the device and/or the user are situated on a water surface whose level is variable.

Let it be assumed that just then, a user, such as the passenger of vehicle 1, is operating one of function devices 12A, 12B via operator unit 3. He happens to be in an interactive session with an Internet application whose graphical output content is shown to him on display panel 3A. He then initiates a manual operator action in order to start the interactive session, this being accomplished by moving his finger 11 in a motion V in the direction of desired operator position 5C on touch-sensitive display panel 3A. The start of the operator action is detected at instant t=t0, when finger 11 of the user enters a previously defined monitoring region in front of operator unit 3.

During the operator action, the trajectory of finger 11, especially its tip, relative to operator unit 3 is detected continuously by approach-detection device 8. In this way, using a further position of finger 11 at a later instant t=t1, it is possible to determine a speed of motion V. In the specific example, operator motion V takes place only in the horizontal direction, so that the z-component of finger 11 remains constant in the first phase of the operator action.

If, at a later instant t=t2, vehicle 1 drives over a pothole or a bump on the road during the operator action, then one of acceleration sensors 10 detects an acceleration of vehicle 1 in the vertical z-direction.

Upon conclusion of the operator action at instant t=T, a manual input for a particular operator position 5A, is finally recorded, which, however, deviates from operator position 5C desired by the user in its vertical component. In this case, the input takes place at an operator position 5A further up on operator unit 3, in accordance with the relative shift of operator unit 3 in relation to finger 11 caused by the acceleration event, because operator unit 3, as a whole, was shifted in the downward direction in relation to finger 11.

The data of the trajectory of finger 11 relative to operator unit 3, and the acceleration data of acceleration sensor 10 is now able to be compared in processing unit 7 using a matching computation algorithm. Depending on the temporal relationship of the operator action and the detected acceleration, a different correction algorithm may be applied.

For example, corrected operator position 5B may result from the calculated intersection of the approach trajectory of finger 11 and operator unit 3 without the detected acceleration. Toward this end, the approach trajectory prior to detecting the acceleration at instant t=t2 is extrapolated in linear fashion. Such a correction, for example, may be used when the input for particular operator position 5A is detected while the detected acceleration is ongoing, or following a time interval that is brief in comparison with the duration of the operator action.

As an alternative, it is also possible to determine a non-linear approach trajectory if, prior to detecting the acceleration, the component of the approach trajectory detected up to this point has the shape of an arc, for example.

It is also possible that a slightly accelerated or decelerated operator action has been detected on the user side.

To determine corrected operator position 5B, the detected approach trajectory of finger 11 toward operator unit 3, and the detected acceleration may also be analyzed such that the complex movement sequence of the coupled system, which encompasses vehicle 1, the user on his seat, and his finger 11, is simulated. In so doing, it can be taken into account how an acceleration of vehicle 1 during an operator action actually would have propagated to finger 11, and in which way this would have changed the approach trajectory starting with the acceleration instant.

After corrected operator position 5B has been calculated, a corresponding control signal is output to control unit 6. This control signal corresponds to touching operator unit 3 at position 5B.

In the example embodiment it has so far been assumed that touching of particular operating position 5A occurred in order to detect the input of the user; however, the present invention is not restricted thereto. For example, a manual operator action in the form of a gesture of the user may be executed, which is detected in front of operator unit 3 (not shown) in contactless manner. If such a gesture is assigned to an operator position, e.g., the virtual turning of a button for one of a plurality of dials displayed on display panel 3A, then a faulty input could come about here as well in the absence of a correction of the operator position, such as when the wrong dial is actuated by the gesture.

LIST OF REFERENCE NUMERALS

1 motor vehicle
2 user interface device
3 operator device
3A display panel
4 operator positions on a touchscreen
4' operator keys
5A determined operator position
5B corrected operator position
5C desired operator position
6 control unit
7 processing unit
8 approach-detection device
9 data bus in the vehicle
10 acceleration sensors
11 finger of a user
12A driver-assistance system in the vehicle
12B infotainment device in the vehicle
V finger motion

The invention claimed is:

1. A method for providing a user interface in a vehicle having an operator unit which encompasses multiple operator positions, the method comprising:
   detecting a manual operator action for the operator unit executed by a control element, wherein an approach trajectory of the control element toward the operator unit is detected during the manual operator action;
   detecting an acceleration event of at least one reference system associated with the control element or the operator unit during the manual operator action;
   detecting an input event at an input location corresponding to a particular operator position selected by the manual operator action executed by the control element;
   calculating a corrected input location corresponding to an intended operator position based on the detected approach trajectory and the detected acceleration event, wherein the calculation of the corrected input location includes one of (i) taking into consideration an oscillation and damping behavior of the at least one reference system subjected to the detected acceleration event and, and (ii) in the case the input event is detected while the detected acceleration is ongoing, extrapolating a portion of the detected approach trajectory occurring prior to the detected acceleration event; and generating a control signal associated with the corrected input location corresponding to the intended operator position.

2. The method according to claim 1, wherein the corrected input location corresponding to the intended operator position is calculated by taking into consideration the oscillation and damping behavior of the at least one reference system subjected to the detected acceleration event.

3. The method according to claim 1, wherein the input event is detected while the detected acceleration is ongoing, and wherein the corrected input location is calculate by extrapolating a portion of the detected approach trajectory occurring prior to the detected acceleration event.

4. The method according to claim 1, wherein an average approach speed of the control element toward the operating unit is detected and considered in calculating the corrected input location.

5. The method according to claim 1, wherein the input for the particular operator position takes place by touching the operator unit.

6. The method according to claim 1, wherein the input for the particular operator position is implemented in contactless manner.

7. The method according to claim 1, wherein the operator positions are displayed on a display panel in context-specific manner.

8. The method according to claim 7, wherein the operator positions are displayed corrected according to the detected acceleration.

9. A device for providing a user interface in a vehicle, comprising:
an operator unit adapted to detect an input event, the operator unit having a plurality of operator positions;
an approach-detection device adapted to detect a manual operator action for the operator unit manually implemented by a control element, wherein an approach trajectory of the control element toward the operator unit is detected during the manual operator action;
at least one acceleration sensor adapted to detect an acceleration event of at least one reference system associated with the control element or the operator unit during the manual operator action; and
a control unit, which is coupled to the operator unit, the approach-detection device, and the at least one acceleration sensor, and which is adapted, when an input event at an input location corresponding to a particular operator position is detected, to calculate a corrected input location corresponding to an intended operator position based on the detected approach trajectory and the detected acceleration event, wherein the calculation of the corrected input location includes one of (i) taking into consideration an oscillation and damping behavior of the at least one reference system subjected to the detected acceleration event and, and (ii) in the case the input event is detected while the detected acceleration is ongoing, extrapolating a portion of the detected approach trajectory occurring prior to the detected acceleration event, and to generate a control signal associated with the corrected input location corresponding to the intended operator position.

10. The device according to claim 9, wherein the corrected input location corresponding to the intended operator position is calculated by taking into consideration the oscillation and damping behavior of the at least one reference system subjected to the detected acceleration event.

11. The device according to claim 9, wherein the input event is detected while the detected acceleration is ongoing, and wherein the corrected input location is calculate by extrapolating a portion of the detected approach trajectory occurring prior to the detected acceleration event.

12. The device according to claim 9, wherein an average approach speed of the control element toward the operating unit is detected and considered in calculating the corrected input location.

13. The device according to claim 9, wherein the operator unit is adapted to implement the input for the particular operator position by touching the operator unit.

14. The device according to claim 9, wherein the operator unit is adapted to implement the input for the particular operator position in contactless manner.

15. The device according to claim 9, wherein the control unit is adapted to display the operator positions on a display panel in context-specific manner.

16. The device according to claim 15, wherein the control unit is adapted to display the operator positions corrected according to the detected acceleration.

17. A vehicle, comprising:
a device for providing a user interface in the vehicle, comprising:
an operator unit adapted to detect an input event, the operator unit having a plurality of operator positions;
an approach-detection device adapted to detect a manual operator action for the operator unit manually implemented by a control element, wherein an approach trajectory of the control element toward the operator unit is detected during the manual operator action;
at least one acceleration sensor adapted to detect an acceleration event of at least one reference system associated with the control element or the operator unit during the manual operator action; and
a control unit, which is coupled to the operator unit, the approach-detection device, and the at least one acceleration sensor, and which is adapted, when an input event at an input location corresponding to a particular operator position is detected, to calculate a corrected input location corresponding to an intended operator position based on the detected approach trajectory and the detected acceleration event, wherein the calculation of the corrected input location includes one of (i) taking into consideration an oscillation and damping behavior of the at least one reference system subjected to the detected acceleration event and, and (ii) in the case the input event is detected while the detected acceleration is ongoing, extrapolating a portion of the detected approach trajectory occurring prior to the detected acceleration event, and to generate a control signal associated with the corrected input location corresponding to the intended operator position.

* * * * *